United States Patent [19]

Wilson

[11] Patent Number: 4,767,385
[45] Date of Patent: * Aug. 30, 1988

[54] BELT TENSIONING MEANS

[75] Inventor: Leslie B. Wilson, Reeds Spring, Mo.

[73] Assignee: Dayco Products, Inc., Dayton, Ohio

[ * ] Notice: The portion of the term of this patent subsequent to Sep. 29, 2004 has been disclaimed.

[21] Appl. No.: 55,575

[22] Filed: May 29, 1987

Related U.S. Application Data

[62] Division of Ser. No. 296,694, Aug. 27, 1981, Pat. No. 4,696,664.

[51] Int. Cl.⁴ .............................................. F16H 7/12
[52] U.S. Cl. .................................... 474/138; 474/111
[58] Field of Search ............... 474/135, 136, 138, 133, 474/111, 109; 198/813, 814; 267/162; 73/862.62

[56] References Cited

U.S. PATENT DOCUMENTS

| | | | |
|---|---|---|---|
| 1,961,368 | 6/1939 | Larson | 73/862.62 |
| 2,162,719 | 6/1939 | Hay | 267/162 |
| 2,163,847 | 6/1939 | Perrey | 73/862.62 |
| 2,337,629 | 12/1943 | Shortell | 73/862.62 |
| 3,413,868 | 12/1968 | Ford | 474/138 |
| 3,418,886 | 12/1968 | Herlach | 267/162 |
| 3,743,266 | 7/1973 | Sturman et al. | 267/162 |
| 3,974,708 | 8/1976 | Geppert | 474/138 |
| 3,980,016 | 9/1976 | Taylor | 267/162 |
| 4,108,013 | 8/1978 | Sragal | 474/135 |
| 4,151,756 | 5/1979 | Binder et al. | 474/138 |
| 4,249,425 | 2/1981 | Watson | 474/110 |
| 4,270,906 | 6/1981 | Kraft et al. | 474/135 |

FOREIGN PATENT DOCUMENTS

| | | | |
|---|---|---|---|
| 279415 | 3/1952 | Switzerland | 474/135 |
| 615549 | 1/1949 | United Kingdom | 188/88.51 |

*Primary Examiner*—Thuy M. Bui
*Attorney, Agent, or Firm*—Joseph V. Tassone

[57] ABSTRACT

A combination of a power transmission belt that is to be operated in an endless path and a tensioner for the belt is provided, the tensioner comprising a support unit fixed relative to the belt, a belt engaging unit carried by the support unit and being movable relative thereto, and a mechanical spring unit operatively associated with the support unit and the belt engaging unit urging the belt engaging unit relative to the support unit in a belt tensioning direction and against the belt with a force to tension the belt, the spring unit being arranged to increase its urging force on the belt engaging unit as the belt engaging unit moves in the belt tensioning direction relative to the support unit throughout the entire normal tensioning range of movement of the belt engaging unit relative to the support unit.

20 Claims, 4 Drawing Sheets 4,767,385

BELT TENSIONING MEANS

CROSS REFERENCE TO RELATED APPLICATION

This application is a divisional patent application of its copending parent patent application, Ser. No. 296,694, filed Aug. 27, 1981, now U.S. Pat. No. 4,606,664.

BACKGROUND OF THE INVENTION

1. Field of the Invention

This invention relates to an improved combination of a power transmission belt that is adapted to be operated in an endless path and a tensioner for such belt.

2. Prior Art Statement

It is known in the art to provide a combination of a power transmission belt that is adapted to be operated in an endless path and a tensioner for the belt, the tensioner comprising a support means fixed relative to the belt, a belt engaging means carried by the support means and being movable relative thereto, and mechanical spring means operatively associated with the support means and the belt engaging means urging the belt engaging means relative to the support means in a belt tensioning direction and against the belt with a force to tension the belt.

Examples of combinations of the above mentioned type are provided in the following seven United States patents:

(1) U.S. Pat. No. 3,413,866—Ford
(2) U.S. Pat. No. 3,974,708—F'Geppert
(3) U.S. Pat. No. 4,108,013—Sragal
(4) U.S. Pat. No. 4,145,934—Sragal
(5) U.S. Pat. No. 4,151,756—Binder et al.
(6) U.S. Pat. No. 4,249,425—Watson
(7) U.S. Pat. No. 4,270,906—Kraft et al.

It appears from item (1) above that a tension spring urges an idler pulley in tensioning engagement against a belt.

It appears from item (2) above that a "Negator" spring urges an idler pulley in tensioning engagement against a belt, the "Negator" spring providing a substantially constant urging force throughout the permissible range of idler pulley positions.

It appears from item (3) above that a compression spring urges an idler pulley in tensioning engagement against a belt.

It appears from item (4) above that a leaf spring urges an idler pulley in tensioning engagement against a belt.

It appears from item (5) above that a plurality of bi-metal dish-shaped springs or spring washers are disposed in various stacked relations thereof and urge an idler pulley in tensioning engagement against a belt.

It appears from item (6) above that pneumatic means is adapted to threadedly adjust an idler pulley rod of a belt tensioner wherein a pair of dish-shaped springs or spring washers urge the idler pulley in tensioning engagement against a belt.

It appears from item (7) above the a plurality of dish-shaped springs or spring washers are disposed in stacked compressed relation to urge a cam member to cam an idler pulley in tensioning engagement against a belt.

It is also known to provide a combination of a power transmission belt that is adapted to be operated in an endless path and a tensioner for the belt, the tensioner comprising a support means fixed relative to the belt, a belt engaging means carried by the support means and being movable relative thereto, and mechanical spring means operatively associated with the support means and the belt engaging means urging the belt engaging means relative to the support means in a belt tensioning direction and against the belt with a force to tension the belt, the spring means comprising a plurality of spring washers disposed in a stack thereof. The tensioner has compressing means compressing the stack of spring washers between the support means and the belt engaging means to provide the urging force on the belt whereby each spring washer is deflected between its inner periphery and its outer periphery by the compressing means.

For example, see aforementioned items (5), (6) and (7).

SUMMARY OF THE INVENTION

It is one feature of this invention to provide an improved combination of a power transmission belt that is adapted to be operated in an endless path and a tensioner for the belt.

In particular, it was found according to the teachings of this invention that as the belt engaging means of a belt tensioner moves in a tensioning direction under the urging force of mechanical spring means of the tensioner, the resulting force vectors in the engaged belt change in such a manner that an increasing tensioning force against the belt is required to compensate for this change in the force vectors of the tensioned belt.

Thus, it was found according to the teachings of this invention that it is possible to arrange a mechanical spring means for a belt tensioner that will increase its urging force on the belt engaging means the further the belt engaging means moves in its belt tensioning direction.

For example, one embodiment of this invention provides a combination of a power transmission belt that is adapted to be operated in an endless path and a tensioner for the belt, the tensioner comprising a support means fixed relative to the belt, a belt engaging means carried by the support means and being movable relative thereto, and mechanical spring means operatively associated with the support means and the belt engaging means urging the belt engaging means relative to the support means in a belt tensioning direction and against the belt with a force to tension the belt, the spring means being arranged to increase its urging force on the belt engaging means as the belt engaging means moves in the belt tensioning direction relative to the support means throughout the entire normal tensioning range of movement of the belt engaging means relative to the support means.

It is another feature of this invention to provide an improved combination of a power transmission belt that is to be operated in an endless path and a tensioner for the belt wherein the tensioner utilizes spring washers in a unique manner.

In particular, it was found according to the teachings of this invention that prior known belt tensioners utilizing spring washers do not utilize only a certain portion of the deflection range thereof in a manner to overcome or compensate for the change in the force vectors that are produced in a tensioned belt as previously set forth.

However, it was found according to the teachings of this invention that it is possible to utilize spring washers in a manner to operate only between approximately 100% deflection thereof to approximatey 50% deflection thereof throughout the entire normal tensioning range of movement of the belt engaging means of a belt tensioner in order to either provide a substantially constant force on the belt throughout substantially the entire normal tensioning range of movement of the belt engaging means or to provide a substantially increasing force on the belt as the belt engaging means moves relative to the tensioner throughout substantially the entire normal tensioning range of movement of the belt engaging means.

For example, another embodiment of this invention provides a combination of a power transmission belt that is adapted to be operated in an endless path and a tensioner for the belt, the tensioner comprising a support means fixed relative to the belt, a belt engaging means carried by the support means and being movable relative thereto, and mechanical spring means operatively associated with the support means and the belt engaging means urging the belt engaging means relative to the support means in a belt tensioning direction and against the belt with a force to tension the belt, the spring means comprising a plurality of spring washers disposed in a stack thereof. The tensioner has compressing means compressing the stack of spring washers between the support means and the belt engaging means to provide the urging force on the belt whereby each spring washer is deflected between its inner and outer peripheries by the compressing means. The stack of spring washers are deflected by the compressing means so as to operate only between approximately 100% deflection thereof to approximately 50% deflection thereof throughout the entire normal tensioning range of movement of the belt engaging means relative to the support means.

Accordingly, it is an object of this invention to provide an improved combination of a power transmission belt that is adapted to be operated in an endless path and a tensioner for the belt, the improved combination of this invention having one or more of the novel features of this invention as set forth above or hereinafter shown or described.

Other objects, uses and advantages of this invention are apparent from a reading of this description which proceeds with reference to the accompanying drawnigs forming a part thereof and wherein:

DESCRIPTION OF THE PREFERRED EMBODIMENTS

Figure 1:
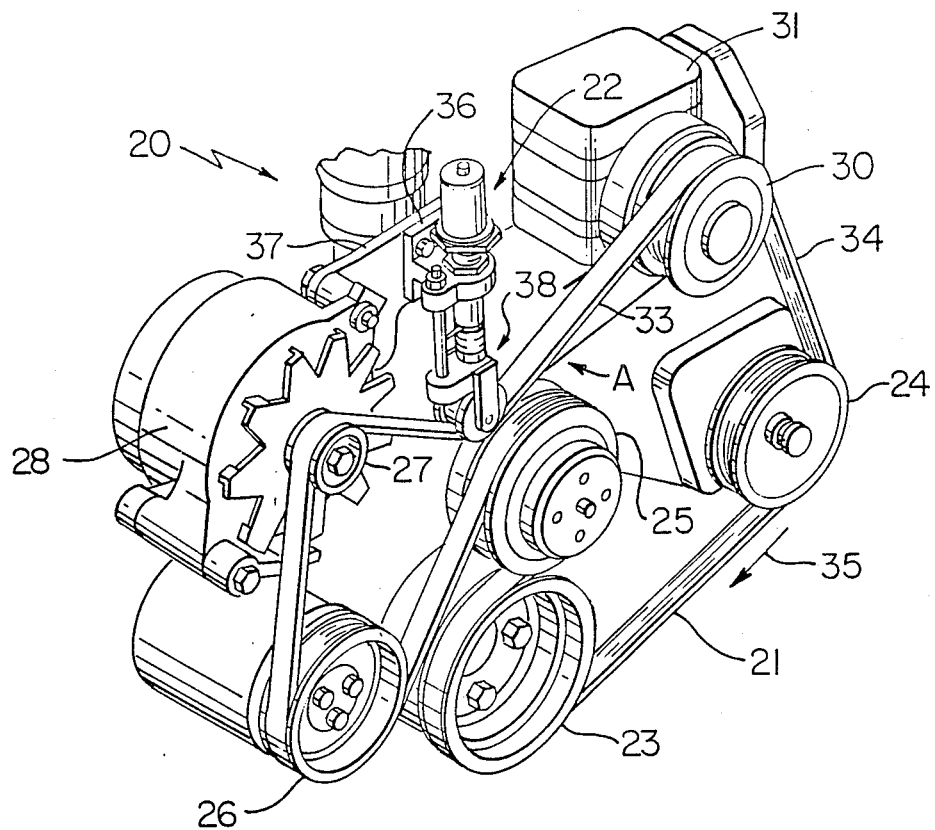
FIG. 1 is a fragmentary isometric view looking toward the front end of an automobile engine which utilizes one embodiment of the belt tensioner of this invention.

While the various features of this invention are hereinafter illustrated and described as providing a combination of a belt tensioner with a particular power transmission belt of a particular motor vehicle engine, it is to be understood that the various features of this invention can be utilized singly or in any combination thereof to provide an improved combination of a belt and a tensioner thereof for other arrangements as desired.

Therefore, this invention is not to be limited to only the embodiments illustrated in the drawings, because the drawings are merely utilized to illustrate one of the wide variety of uses of this invention.

Figure 2:
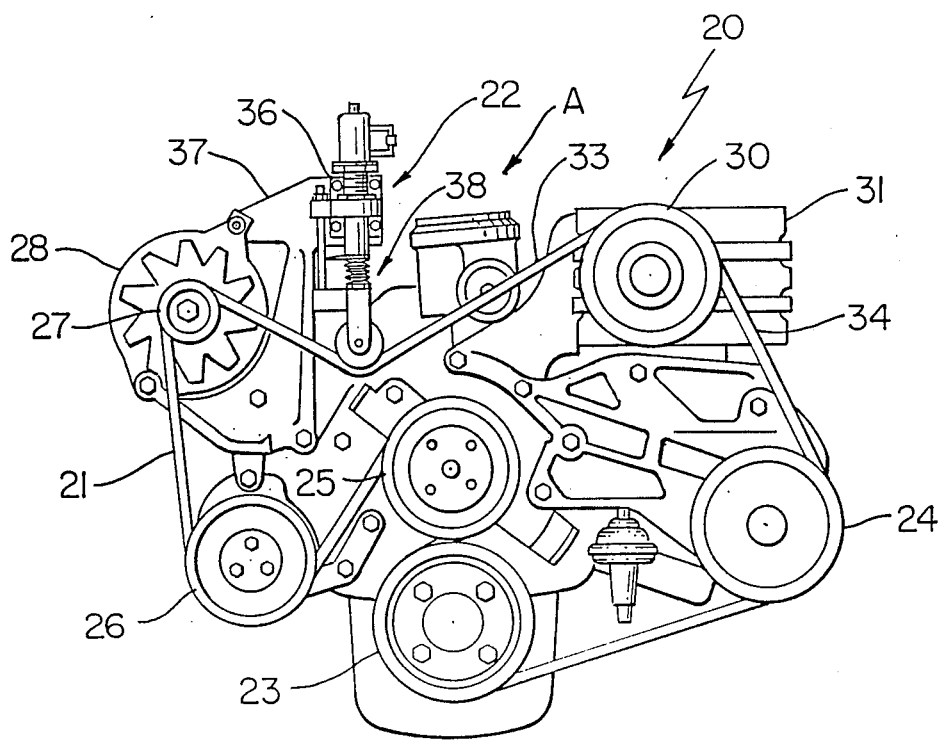
FIG. 2 is a view looking perpendicularly toward the front end of the automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, the improved belt tensioner of this invention being generally indicated by the reference numeral 22 and being utilized to provide a tensioning force on the belt 21 in a manner hereinafter set forth whereby the combination of the belt 21 and the tensioner 22 forms the improved combination of this invention and such combination is generally indicated by the reference letter A in FIGS. 1 and 2.

The endless power transmission belt 21 may be of any suitable type known in the art and is preferably made primarily of a polymeric material because the unique features of the tensioner 22 of this invention readily permit the tensioner 21 to tension a belt having a polyester load-carrying cord in an efficient manner as hereinafter described.

The belt 21 is driven by a driving sheave 23 which is operatively interconnected to the crankshaft of the engine 20 in a manner well known in the art. The driving sheave 23 drives the belt 21 in an endless path and thereby drives a sheave 24 of a power steering device used in an automobile (not shown) utilizing the engine 20, a sheave 25 of an engine water pump, a sheave 26 of an air pump of a type used in an antipollution system for the engine 20, a sheave 27 of an engine electrical alternator 28, and a sheave 30 of a compressor 31 of an air conditioning system for the automobile utilizing the engine 20.

All of the driven accessories, through their sheaves 24, 25, 26, 27 and 30, impose a load on the belt 21. However, only the detailed description of the load being imposed by the compressor 31 and its sheave 30 on the belt 21 will be hereinafter described inasmuch as such load is generally of a comparatively high magnitude.

In particular, the compressor 31, upon being driven, creates a slack side 33 and a tight side 34 in the belt 21 upon turning on of the air conditioner system in the automobile, the slack side 33 and tight side 34 being produced since the belt is rotating clockwise as indicated by the arrow 35 in FIGS. 1 and 2.

The belt tight side 34 (and hence, slack side 33) varies in tightness, i.e., magnitude of tightness, in a cyclic manner and as a function of the inherent cyclic change in the loads imposed by the air compressor 31. This cyclic change and load varies between greater extremes in application where the compressor 31 is of a piston type. The cyclic load imposed by the compressor 31 has a tendency to cause the slack side 33 of the belt 21 to vibrate or oscillate.

In addition to such vibrations and oscillations of the belt 21, it is known that normal belt wear and heat variations in the engine compartment for the engine 20 produces variations in the length of the belt 21 that require compensation for the same.

Thus, it is known that it is difficult to maintain such a belt 21 under tension with a force required to insure non-slipping engagement and driving of the driven sheaves whereby numerous belt tensioners have been proposed and used heretofore in an effort to provide the required tension.

It is believed that the improved belt tensioner 22 of this invention functions in a manner to provide a proper tensioning force on the belt 21 to overcome the aforementioned problems, namely, provides the required tension in the overall belt 21 as well as prevents any tendency of the belt to oscillate in an undesirable manner as a result of the cyclic load change imposed by the compressor 31 whereby the improved belt tensioner 22 of this invention will now be described.

Figure 3:
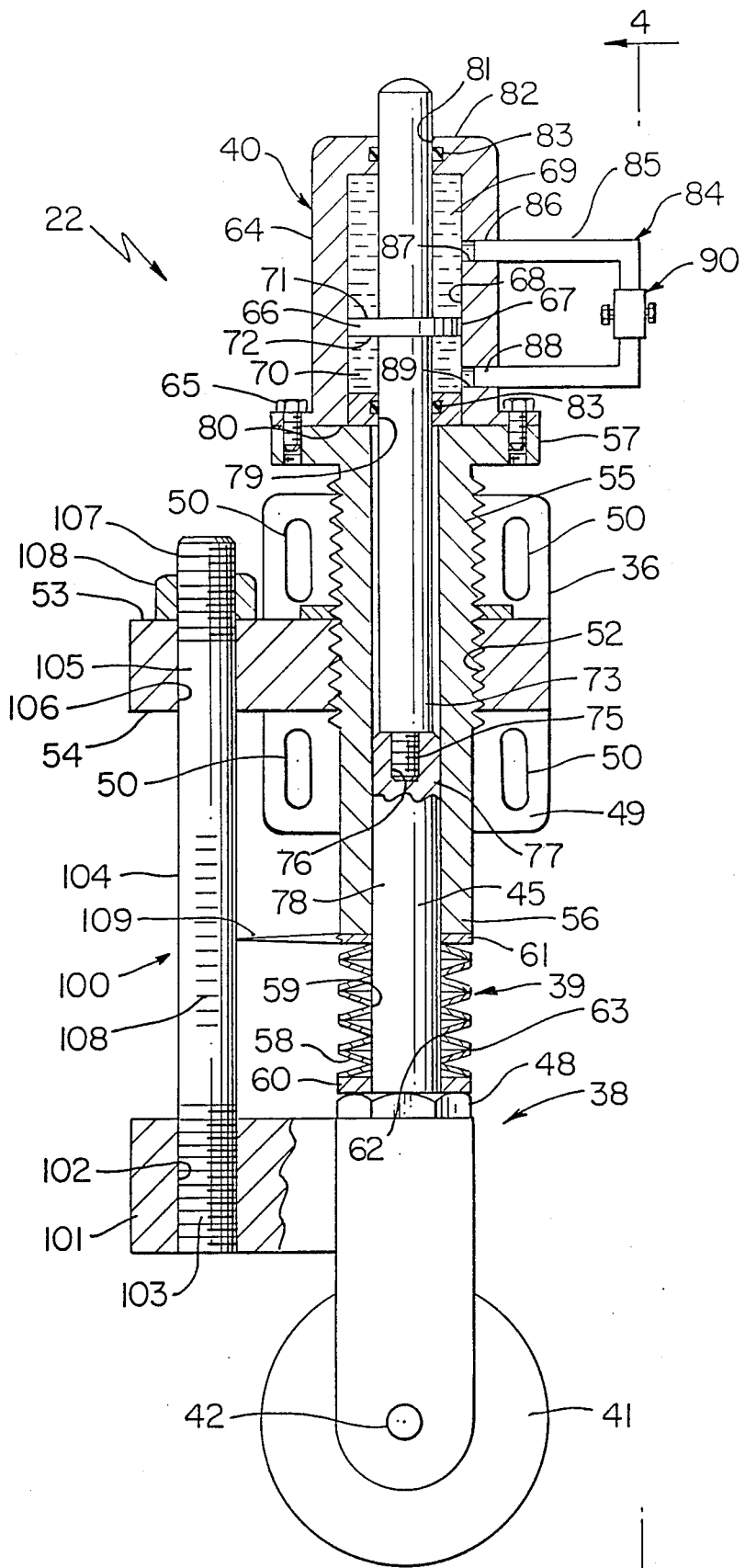
FIG. 3 is an enlarged front view, partially in cross section, of the belt tensioner of this invention that is being utilized for tensioning the power transmission belt of FIGS. 1 and 2.
Figure 4:
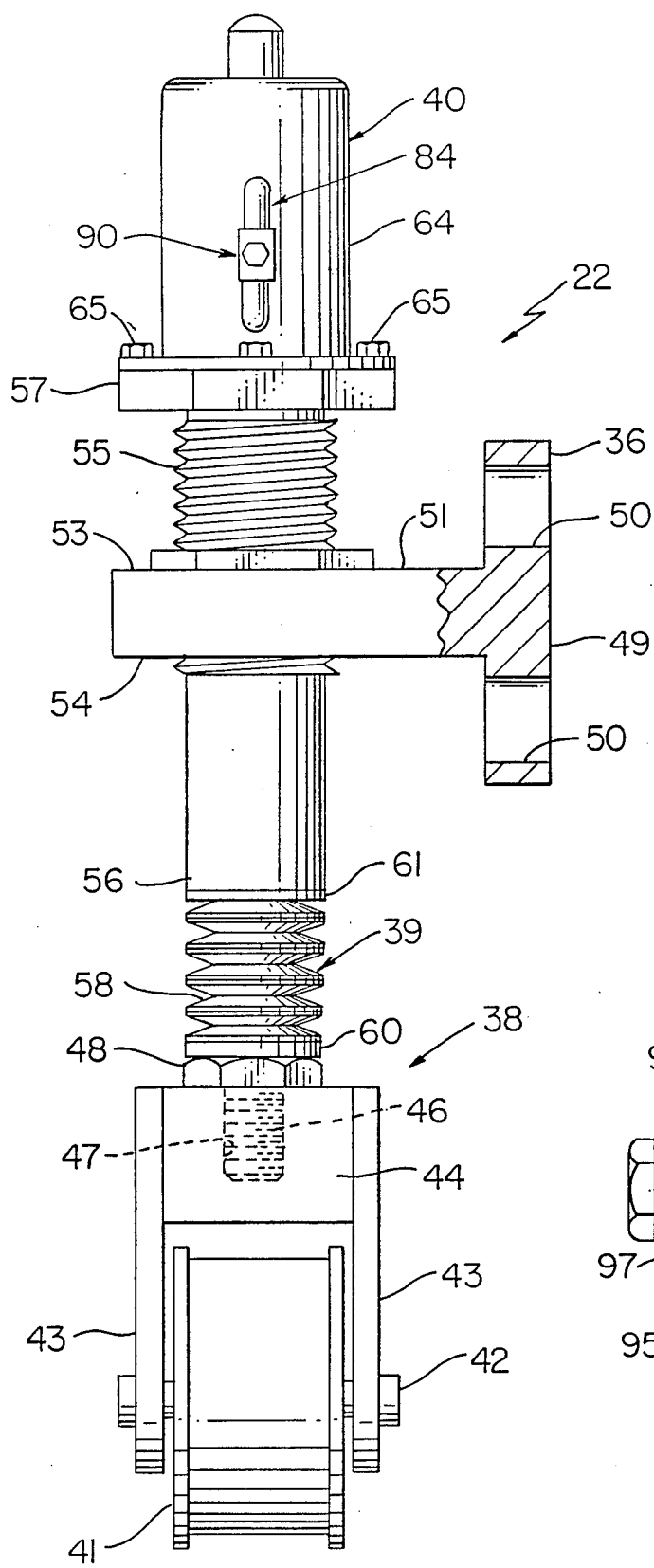
FIG. 4 is a side view of the belt tensioner of FIG. 3 and is taken in a direction of the arrows 4—4 of FIG. 3.

As best illustrated in FIGS. 3 and 4, the improved belt tensioner 22 of this invention comprises a support means 36 adapted to be fixed to a mounting bracket 37 of the engine 20 as illustrated in FIGS. 1 and 2. A belt engaging means that is generally indicated by the reference numeral 38 is movably carried by the support means 36 in a manner hereinafter set forth. The tensioner 22 has mechanical spring means that is generally indicated by the reference numeral 39 operatively associated with the support means 36 and belt engaging means 38 to tend to urge the belt engaging means 38 against the slack side 33 of the belt 21 in substantially a true vertically downwardly direction in a manner to substantially bisect the angle made by the belt 21 between the sheaves 27 and 30 as illustrated in FIG. 2.

The belt tensioner 22 also includes a fluid dampening means that is generally indicated by the reference numeral 40 and is operatively associated with the support means 36 and the belt engaging means 38 to dampen movement of the belt engaging means 38 relative to the support means 36 in a manner hereinafter set forth.

However, it is to be understood that the belt tensioner 22 of this invention can be utilized without the fluid dampening means 40, if desired, because part of this invention is directed to the unique spring means 39 in combination with the tensioner 22 and belt 21 whereas the fluid dampening means 40 can be utilized with other types of mechanical spring means. Thus, such fluid dampening means 40 is disclosed and claimed in applicant's copending patent application Ser. No. 296,695, filed Aug. 27, 1981, now U.S. Pat. No. 4,411,638.

The belt engaging means 38 includes an idler pulley 41 rotatably mounted by pivot pin means 42 to a pair of depending flanges 43 fastened to a block 44 that is threadedly interconnected to a rod or a shaft 45, the rod 45 having an externally threaded end 46 threadedly disposed in an internally threaded opening 47 in the block 44 and being secured therein by a lock nut means 48 in a manner well known in the art.

In this manner, the idler pulley 41 is rotatably mounted within the yoke arrangement provided by the flanges 43 and the block 44 to engage against the belt 21 as illustrated in FIGS. 1 and 2.

The support means 36 includes a substantially flat plate-like member 49 having suitable elongated slots or openings 50 passing therethrough for adjustably mounting the support means 36 to any desired structure, such as the mounting bracket 37 of the engine 20 of FIGS. 1 and 2.

The support means 36 includes another plate-like portion 51 extending transverse to the plate 49 and being secured thereto in any suitable manner, such as by being welded thereto or being integral and one-piece therewith as desired. The plate 51 has a threaded opening 52 passing through opposed sides 53 and 54 thereof and threadedly receives a tubular support member 55 of the support means 36 which is adapted to be axially adjustable in the threaded opening 52 to position the lower end 56 of the tubular support 55 at desired distances below the lower surface 54 of the support plate 51 for a purpose hereinafter described. For example, the tubular member 55 can have a hexagonally shaped upper portion 57 so that suitable wrenches and the like can be utilized to threadedly adjust the tubular member 55 in the support plate 51 before or after the support means 36 has been mounted to the mounting bracket 37 of the engine 20 to initially set the force of the spring means 39 on the belt 21 as will be apparent hereinafter.

The spring means 39 comprise a plurality of spring discs 58 that have central openings 59 passing therethrough and permitting the spring discs 58 to be disposed in a particular stacked relation on the rod 45 between a pair of flat washer-like members 60 and 61 respectively disposed against the lock nut means 48 and the end 56 of the tubular support member 55.

The spring discs 58 are of the type commonly sold and known as "belleville spring washers" and can be so selected and arranged according to the teachings of this invention in a manner hereinafter set forth that the spring washers 58 will provide a substantially constant urging force or an increasing urging force as the idler pulley 41 is being moved toward the belt 21 to take up further slack therein under the spring force of the spring member 58. The spring discs or washers 58 when compressed between their inner peripheries 62 and outer peripheries 63 deflect in such a manner that the same store spring energy to tend to expand the same and thereby urge the pulley 41 away from the support means 36 toward the belt 21 as will be apparent hereinafter.

The fluid dampening means 40 comprises a cylinder member 64 adapted to be secured to the upper hexagonal portion 57 of the tubular support member 55 in any suitable manner, such as by fastening means 65 as illustrated in FIGS. 3 and 4.

A piston member 66 is disposed in the cylinder member 64 and has an outer peripheral portion 67 adapted to be disposed closely adjacent the internal peripheral surface 68 of the cylinder member 64 to define opposed chambers 69 and 70 on opposite sides 71 and 72 thereof while being movable in the cylinder member 64 in a manner well known in the art, the piston member 66 being secured in any suitable manner to the rod 45 which includes an upper extension 73 that has a lower externally threaded end 75 threadedly received in an internally threaded bore 76 in the upper end 77 of a lower portion 78 of the rod 45 as illustrated.

In this manner, movement of the idler pulley 41 relative to the support means 36 causes like movement of the piston member 66 in the cylinder member 64 so as to change the volumes of the chambers 69 and 70 for a fluid dampening purpose hereinafter described.

The rod extension 73 extends through an opening 79 in the lower end 80 of the cylinder member 64 as well as out of an opening 81 in the upper end 82 of the cylinder member 64, suitable sealing means 83 being carried by the ends 80 and 82 of cylinder member 64 to seal with the rod extension 73 and thereby seal the chambers 69 and 70 from the respective openings 81 and 79 of the ends 82 and 80 of the cylinder member 64.

A passage defining means that is generally indicated by the reference numeral 84 in FIGS. 3 and 4 is utilized to fluidly interconnct the chambers 69 and 70 of the cylinder member 64 and thereby provide a closed fluid loop arrangement, the passage defining means 84 comprising a conduit means 85 having one end 86 secured in an opening 87 in the cylinder member 64 that leads to the top of the chamber 69 while the other end 88 of the conduit menas 85 is secured in an opening 89 formed in the cylinder member 64 and being disposed in communication with the bottom of the chamber 70 as illustrated.

The passage defining means 84 has a flow control valve means therein that is generally indicated by the reference numeral 90 in FIGS. 3 and 4 and in the preferred embodiment of this invention is adapted to provide a greater restricting flow of fluid from the chamber 69 to the chamber 70 through the passage defining means 84 than the restricting force of fluid flow from the chamber 70 to the chamber 69 as will be apparent hereinafter.

While the flow control means 90 can be of any conventional form well known in the art, one typical flow control valve means 90 that can be utilized is generally indicated by the reference numeral 91 in FIG. 5 and will later be described.

However, it is to be understood that the flow control means 90 can be affixed flow control means, an adjustable flow control means and even be adapted to close the passage defining means 84 to substantially lock the idler pulley 41 in a set position relative to the support means 36 as will be apparent hereinafter.

In any event, the dampening means 40 is filled with any suitable fluid in such a manner that both chambers 69 and 70 of the cylinder member 64 are substantially filled with such fluid as well as the entire passage defining means, it presently being preferred that the fluid comprises a liquid, such as a hydraulic oil or the like.

If desired, a spring deflection load calibration indicator means that is generally indicated by the reference numeral 100 in FIGS. 3 and 4 can be utilized to initially set the amount of deflection or compression of the spring members 58 so that the same will initially provide a certain spring force against the belt 21 when the tensioner 22 is initially mounted to the bracket 37 of the engine 20.

The pulley block 44 has an extension 101 provided with a threaded bore 102 threadedly receiving an externally threaded end 103 of a rod 104 that has its upper end 105 loosely passing through an opening 106 in the support plate 51, the rod 104 having an upper externally threaded end 107 receiving a nut 108 for engaging against the upper surface 53 of the plate 51 as illustrated when the springs 58 are disposed in their fully expanded condition.

The rod 104 is provided with suitable indicator mark 108 thereon that are adapted to cooperate with an indicator pointer 109 carried by the tubular support member 55 whereby the position of the marks 108 on the rod 104 relative to the indicator 109 provides a visual measurement of the amount of deflection or compression of the spring members 58 between the support means 36 and the belt engaging means 38 and, thus, the amount of initial load being imposed on the belt 21.

In particular, when the support means 36 is in a fixed position against the bracket 37 and the pulley 41 is disposed against the belt 21, rotation of the tubular support member 55 in a direction to cause the end 56 thereof to move toward the pulley 41 causes the spring discs 58 to be compressed between the end 56 of the tubular member 55 and the pulley block 44 and such movement of the end 56 of the tubular support 55 moves the indicator 109 downwardly relative to the marks 108 on the indicating rod 104 so that when the desired deflection is reached, rotation of the support member 55 is terminated. In this manner, the indicator means 108, 109, will provide the assurance that a proper deflection of the spring members 58 is taking place when the idler pulley 41 is initially installed and engaging against the belt 21 and it can be seen that the tubular support member 55 acts as an adjustable compressing means of the tensioner 22 for compressing the spring washers 58.

The support means 36 is mounted to the bracket 37 of the engine 20 in such a manner that the axis of the rod means 45 is disposed substantially perpendicular to the path of travel 35 of the portion 33 of the belt 21 and substantially bisects the V-shaped angle that he portion 33 makes between the sheaves 27 and 30 as illustrated in FIGS. 1 and 2.

It has been found that with such an arrangement, the force vectors produced in the potion of the belt 33 opposing the force of the tensioner 22 change in such a manner that it requires a greater tensioning force to overcome the force of the belt 21, the further inwardly the idler pulley 41 moves away from the support means 36 and towards the belt 21.

Figure 6:
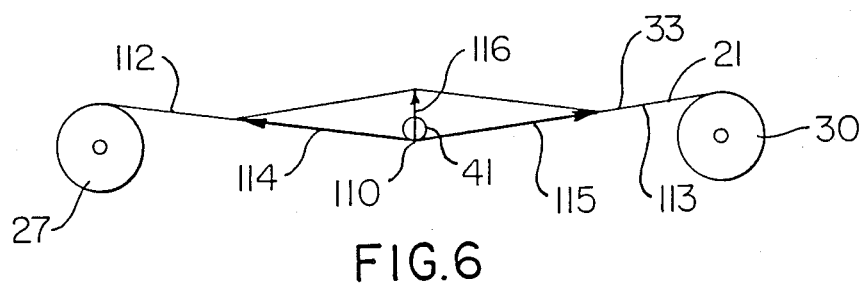
FIG. 6 is a schematic view illustrating the force vectors produced by a tensioned belt when that belt is in one tensioned condition thereof.

For example, reference is now made to FIG. 6 wherein the portion 33 of the belt 21 is shown schematically as extending between the sheaves 27 and 30 with the portion of the belt 33 being engaged at the point 110 by the idler pulley 41 which defines two parts 112 and 113 of the belt 21 that respectively extend away from the point 110 toward the sheaves 27 and 30 whereby the belt portion 33 defines a substantially V-shape with the pulley 41 being at the apex 110 thereof. The belt 21 exerts an upward force against the pulley 41 in the parts 112 and 113 of the belt 21 and such force vectors are represented by the arrows 114 and 115 in FIG. 6, the resulting force of the vectors 114 and 115 being represented by the force vector arrow 116 illustrated in FIG. 6. The force vector 116 is the force the spring means 39 of the tensioner 22 must overcome in order to hold the belt 21 in the V-shape illustrated in FIG. 6.

Figure 7:
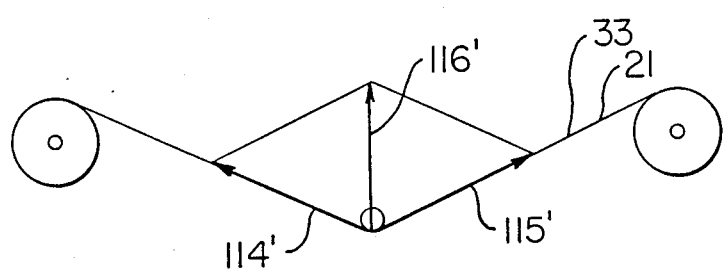
FIG. 7 is a view similar to FIG. 3 and illustrates the force vectors of the tensioned belt when the tensioned belt is in another tensioned condition thereof.

However, it can readily be seen in FIG. 7 that when a greater slack is produced in the portion 33 of the belt 21 so that when the belt 21 tends to move upwardly from the position illustrated in FIG. 7, the force vectors 114' and 115' in FIG. 7 produce the force vector 116' in FIG. 7 that is substantially greater than the force vector 116 of FIG. 6 so that the spring means 39 of the tensioner 22 must overcome the larger force vector 116' of FIG. 7 in order to hold the portion 33 of the belt 21 in the V-shape illustrated in FIG. 7.

Accordingly, it was found according to the teachings of this invention that the spring washers 58 can be so chosen and so initially compressed by the compressing means or tubular support member 55 after the tensioner 22 has been installed on the bracket 37 and has the idler pulley 41 engaging the belt 21 in a manner hereinafter set forth, that a substantially constant urging force is produced by the spring members 58 throughout substantially the entire normal tensioning range of movement of the belt engaging means 38 relative to the support means 36 or that a substantially progressively increasing urging force is produced by the spring members 58 on the belt 21 as the belt engaging menas 38 moves relative to the support means 36 in the belt tensioning direction throughout substantially the entire normal tensioning range of movement of the belt engaging means 38 relative to the support means 36.

In particular, it is well known that spring washers produce various spring forces thereof in various stages of deflection thereof and such spring forces can be related to the cone height to thickness ratio thereof.

Figure 8:
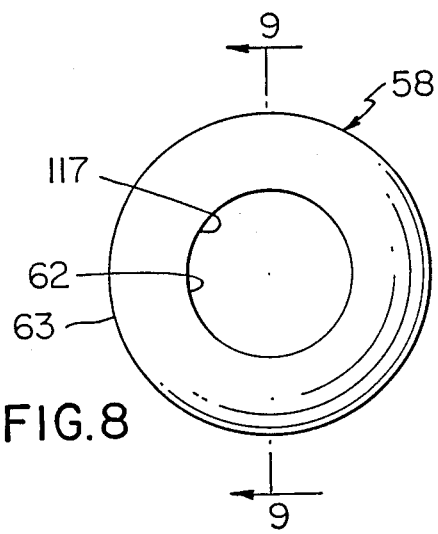
FIG. 8 is a front view of one of the spring washers utilized in the tensioner of FIGS. 3 and 4.
Figure 9:
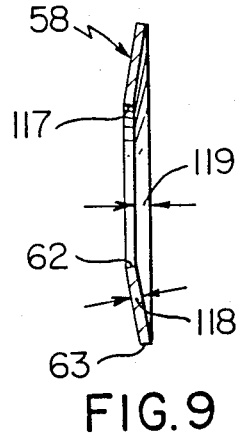
FIG. 9 is a cross-sectional view of the spring washer of FIG. 8 and is taken in the direction of the arrows 9—9 of FIG. 8.

For example, reference is made now to FIGS. 8 and 9 wherein a typical spring washer 58 is illustrated and has a central opening 117 passing therethrough and defining the inner periphery 62 thereof which is concentrically disposed within the outer periphery 63 thereof. In the relaxed condition of the spring washer 58 illustrated in FIGS. 8 and 9, it can be seen that the same has a substantially uniform cross-sectional thickness that is generally indicated by the reference numeral 118 in FIG. 9. Also, in such relaxed state of the spring washer 58 illustrated in FIGS. 8 and 9, the spring washer 58 has a cone height that is generally indicated by the reference numeral 119 in FIG. 9.

Figure 10:
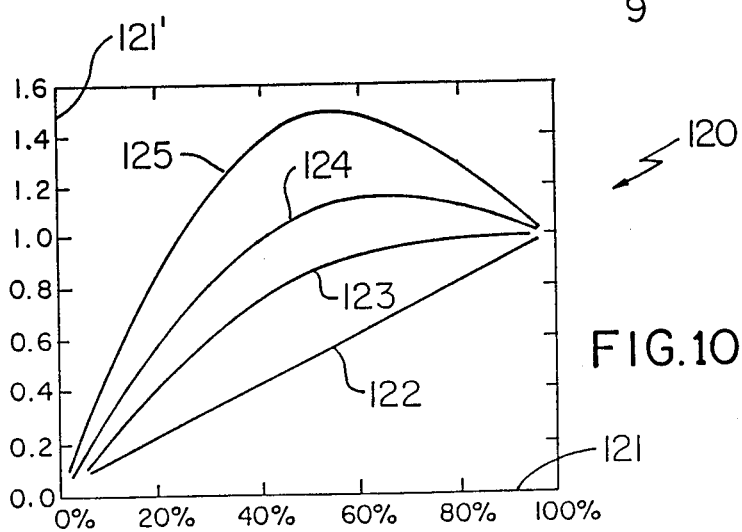
FIG. 10 is a graph illustrating the forces produced by spring washers having different cone height to thickness ratios.

The graph 120 illustrated in FIG. 10 has the X axis 121 thereof representing from left to right the increasing deflection of spring washers from 0% deflection thereof to 100% deflection thereof while the Y axis 121' represents the spring force produced by a spring washer in each of its deflected positions, the Y axis 121' increasing in value from the bottom thereof to the top thereof. The lines 122, 123, 124 and 125 on the graph 120 respectively represent spring washers 58 that have cone height to thickness ratios of 0.4, 1.4, 1.8 and 2.2.

Accordingly, it can be seen that if the spring washers 58 utilized in the spring means 39 of the tensioner 22 of this invention are selected so as to have a cone height to thickness ratio of between approximately 1.4 and 1.8 and the compressing means 55 is adjusted so that such spring washers 58 are disposed in approximately 100% deflection thereof when the tensioner 22 of this invention is initially mounted to the engine 20, subsequent expansion of those spring washers 58 up to approximately 50% deflection thereof will produce a substantially constant force whereby it has been found that the tensioner 22 can be designed so that the same will only have to normally operate in the movement of the idler pulley 41 thereof relative to the support means 36 a distance that will not be greater than can be produced by the spring washers 58 expanding from the almost 100% deflected condition thereof to the approximately 50% deflection condition thereof.

In order to have the spring washers 58 produce an increasing force as the same expand from their deflected conditions, it can be seen from the graph 120 of FIG. 10 that such spring washers 58 produce an increasing force therefrom if the same has a cone to height ratio from approximately 1.6 to approximately 3.0 and such increasing force takes place during the expansion of such spring washers 58 from approximately 100% deflection thereof to approximately 50% deflection thereof as such increasing force is the negative rate range of such spring washers 58. Thus, it can be seen that by designing the tensioner 22 to have the idler pulley 41 be moved relative to the support means 36 in a belt tensioning direction during the normal tensioning range of movement required a distance that is not greater than the amount of movement thereof that can be produced by the spring washers 58 expanding from approximately a 100% deflection condition thereof to approximately 50% deflection condition thereof, the belt tensioner 22 will have the spring means 39 produce a progressively increasing force as the belt tensioner 22 has the belt engaging means 38 thereof further moved in the belt tensioning direction thereof.

Therefore, it can be seen that the stack of spring washers 58 that form the spring means 39 of the tensioner 22 of this invention can be so selected and be so initially compressed by the compressing means 55 after the tensioner 22 has been installed in the engine 20 in the manner previously described that the stack of spring washers 58 need only operate between a 100% deflection condition thereof to approximately a 50% deflection condition thereof throughout the entire normal tensioning range of movement of the belt engaging means 38 relative to the support means 36 in the belt tensioning direction thereof, the stack of spring washers 58 either providing a substantially constant force on the belt throughout substantially the entire normal tensioning range of movement of the belt engaging means 38 relative to the support means 36 or providing a substantially increasing force on the belt 21 as the belt engaging means 38 moves relative to the support means 36 in the belt tensioning direction throughout the entire normal tensioning range of movement of the belt engaging means 38 relative to the support means 36.

One typical spring washer 58 that can be utilized to produce the aforementioned constant force on the belt 21 has in the relaxed condition thereof a diameter of approximately 2 inches, a central opening 117 of approximately 1 inch in diameter, a thickness 118 of approximately 0.035 of an inch and a cone height 119 of approximately 0.052 of an inch.

One typical spring washer 58 that can be utilized to produce the progressively increasing force on the belt 21 has in its relaxed condition thereof a diameter of approximately 2 inches, a central opening 117 passing therethrough of approximately 1 inch in diameter, a thickness 118 of approximately 0.030 of an inch, and a cone height 119 of approximately 0.070 of an inch.

However, this invention is not to be limited to any specific spring washer 58 and the above examples are merely given for illustrative purposes.

Therefore, it can be seen that it is a relatively simple method of this invention to make the improved belt tensioner 22 of this invention that is adapted to operate in a manner now to be described.

When the tensioner 22 of this invention has been mounted by its support plate 49 to the bracket 37 of the engine 20 so that the idler pulley 41 thereof is engaging against the belt 21 under the urging force of the spring members 58, the installer can adjust the tubular support member 55 upwardly or downwardly relative to the plate 51 so that the spring means 58 will be under a certain initial deflection as determined by the position of the proper marks 108 on the rod 104 relative to the indicator 109 in the manner previously set forth whereby the tensioner 22 of this invention will be providing a predetermined force against the belt 21 in the at rest position of the engine 20. In addition, the flow control valve 90 has been either factory adjusted or installer adjusted to set the desired differential flow characteristics between the chambers 69 and 70 of the dampening means 40.

Thereafter, each time the engine 20 is initially started so as to cause slack in the slack side 33 of the belt 21 and a tightening in the tight side 34 thereof, the force of the spring means 58 causes the idler pulley 41 to move inwardly to take up the slack of the belt 21 on the slack side 33 thereof and provide a tensioning force thereon as determined by the force of the spring members 58, such inward movement of the pulley 41 causing the piston member 66 to move downwardly in FIG. 3 and displace fluid in the chamber 70 through the passage defining means 84 and the flow control valve means 90 to the chamber 69 in a manner to dampen such downward movement of the pulley 41.

Thus, it can be seen that as the belt 21 is traveling in the direction of the arrow 35 in FIGS. 1 and 2 by the running engine 20, any vibrations and oscillations of the belt 21, such as caused by the turning on and off of the air conditioning compressor 31 as previously set forth, will cause an up and down oscillation of the portion 33 of the belt 21 which movement is imposed on the pulley 41 of the tensioner 22.

In those instances where the deflection of the portion 33 of the belt 21 is upwardly in FIGS. 1 and 2 to tend to cause the pulley 41 to move upwardly relative to the support means 36, such movement causes the piston member 66 to move upwardly and thereby force the fluid from the chamber 69 through the passage defining means 84 and flow control valve 90 to the chamber 70 and since the flow control valve means 90 is set to restrict such flow at a greater rate than in the reverse direction of fluid flow through the passage defining means 84, such upward movement of the pulley 41 relative to the support means 36 is at a slower rate than when the pulley 41 is being moved downwardly away from the support means 36, the flow control means 90 being such that even the downward movement of the pulley 41 away from the support means 36 is dampened to a desired degree.

In this manner, it is believed that the dampening means 40 of this invention will prolong the life of the tensioner 22 so that rapid oscillations of the spring means 58 thereof cannot take place and the spring means 58 will perform their tensioning function in a relatively smooth manner and provide either a constant tensioning force or an increasing tensioning force as the idler pulley 41 moves in its tensioning direction as previously described.

In particular, since the flow control means 90 provides preferential flow ratio that can be controlled, the tensioner 22 will deliver increased tension on the belt 21 when the belt 21 is subjected to acceleration and/or heavy cyclic loads commonly encountered in belt drive systems. Accordingly, if the fluid flow from chamber 69 to chamber 70 is more restrictive than reverse flow, load fluctuations in the belt system will result in an increased pressure on the top side 71 of the piston 66 which will force the idler pulley 41 down into the belt 21 and result in greater belt tension. In this manner, the tensioner 22 will deliver greater tension when the system demands and less tension when less tension is required. This can result in increased bearing life in belt driven accessories, reduced belt slippage under heavy loading conditions, and an increased effective life of the tensioner 22 itself.

Figure 5:
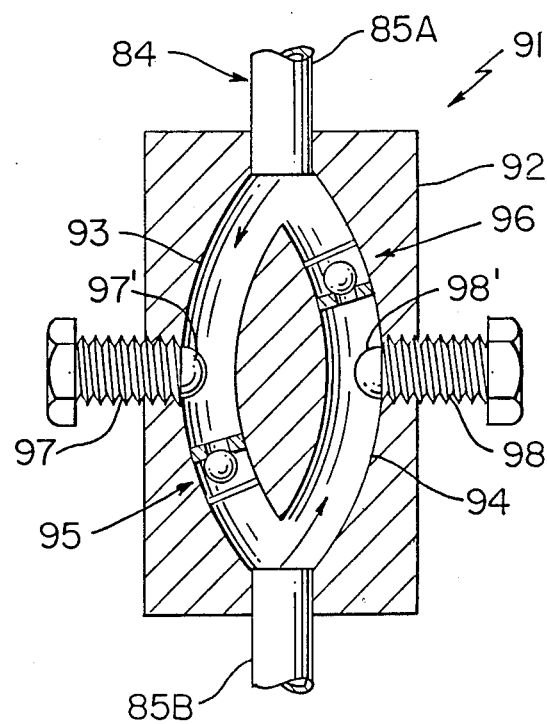
FIG. 5 is a fragmentary cross-sectional view illustrating a typical flow control valve that can be utilized with the belt tensioner of this invention that is illustrated in FIG. 3.

The flow control valve 91 schematically illustrated in FIG. 5 comprises a housing means 92 provided with two branch passages 93 and 94 passing therethrough and which are joined together at their respective ends so as to be joined to the respective parts 85A and 85B of the conduit means 85 of the passage defining means 84, the branch passage 93 having a one-way check valve means 95 therein and the passage 94 having a one-way check valve 95 therein whereby the flow of fluid from the upper conduit part 85A to the lower conduit part 85B can only take place through the branch passage 93 because of the one-way check valve means 95 thereof and the fluid flow from the lower conduit part 85B to the upper conduit part 85A can only take place through the branch passage 94 because of the one-way check valve 96. The check valves 95 and 96 comprise conventional ball and seat check valves and are well known in the art.

A pair of threaded adjusting flow control valve members 97 and 98 are threadedly carried by the housing means 92 and respectively have ends 97' and 98' that control the amount of fluid flow through the respective branch passages 93 and 94 depending upon the threaded relationship of the respective adjusting members 97 and 98 relative to the housing means 92, such flow control means 97 and 98 being well known in the art.

In this manner, by setting the adjusting members 97 and 98 in the desired flow controlling relation, the rate of fluid flow through the passage 93 can be set to be more restrictive than the rate of fluid flow through the passage 94 set by the adjusting member 98 for the reasons previously set forth and, if desired, the tensioner 22 can be substantially locked in a set position thereof by utilizing the adjusting members 97 and 98 to completely close off the passages 93 and 94 so that there can be no fluid flow through the passage defining means 84 from the chambers 69 and 70 of the cylinder member 64.

Of course, it is to be understood that the flow control device 91 illustrated in FIG. 5 is merely for illustrative purposes and other flow control devices can be utilized whether the flow rates thereof are adjustable, fixed, or comprise two separate devices or a single device, as desired.

Also, while the spring means 39 has been illustrated and described as being remote from the dampening means 40 of the tensioner 22, it is to be understood that the spring washers 58 could be disposed in either chamber 69 or 70 or in both chambers 69 and 70, if desired.

Therefore, it can be seen that this invention provides an improved combination of a power transmission belt and tensioner for the belt.

While the forms of this invention now preferred have been illustrated and described as required by the Patent Statute, it is to be understood that other forms can be utilized and still fall within the scope of the appended claims.

What is claimed is:

1. In the combination of a power transmission belt that is adapted to be operated in an endless path and a tensioner for said belt, said tensioner comprising a support means fixed relative to said belt, a belt engaging means carried by said support means and being movable relative thereto, and mechanical spring means operatively associated with said belt engaging means relative to said support means in a belt tensioning direction and against said belt with a force to tension said belt, the improvement wherein said tension has means causing said spring means to increase its urging force on said belt engaging means as said belt engaging means moves in said belt tensioning direction relative to said support means throughout the entire normal tensioning range of movement of said belt engaging means relative to said support means.

2. A combination as set forth in claim 1 wherein said means of said tensioner causes said spring means to increase said urging force substantially progressively within certain limits as said belt engaging means moves in said belt tensioning direction relative to said support means.

3. A combination as set forth in claim 1 wherein said spring means has a negative spring rate range, said means of said tensioner causing said spring means to urge said belt engaging means in said belt tensioning direction relative to said support means in only said negative spring rate range thereof.

4. A combination as set forth in claim 1 wherein said spring means comprises a plurality of spring washers disposed in a stacked relation.

5. A combination as set forth in claim 4 wherein said spring washers each has a deflection range a part of which is a negative spring rate range, said spring washers urging said belt engaging means in said belt tensioning direction relative to said support means in only the negative spring rate range thereof.

6. A combination as set forth in claim 5 wherein said spring washers each has a cone height to thickness ratio of approximately 1.6 to approximately 3.0.

7. A combination as set forth in claim 6 wherein said negative spring rate range of each said spring washer is substantially in the upper half of its said deflection range.

8. A combination as set forth in claim 7 wherein said tensioner has a deflection indicator means for indicating the amount of deflection of said spring washers in each position of said belt engaging means relative to said support means.

9. In the combination of a power transmission belt that is adapted to be operated in an endless path and a tensioner for said belt, said tensioner comprising a support means fixed relative to said belt, a belt engaging means carried by said support means and being movable relative thereto, and mechanical spring means operatively associated with said support means and said belt engaging means urging said belt engaging means relative to said support means in a belt tensioning direction and against said belt with a force to tension said belt, the improvement wherein said spring means is arranged to increase is urging force on said belt engaging means as said belt engaging means moves in said belt tensioning direction relative to said support means throughout the entire normal tensioning range of movement of said belt engaging means relative to said support means said spring means comprises a plurality of spring washers disposed in a stacked relation, said spring washers each having a deflection range a part of which is a negative spring rate range, said spring washers being arranged to urge said belt engaging means in said belt tensioning direction relative to said support means in only the negative spring rate range thereof, said belt engaging means including an idler pulley means having a rod means interconnected thereto, said support means including a tubular support member telescopically receiving part of said rod means therein to guide movement of said idler pulley means relative to said support means, said spring washers each having a central opening passing therethrough and telescopically receiving said rod means through said openings thereof whereby said spring washers are disposed in stacked relation on said rod means, said spring washers being disposed in said stacked relation thereof between said tubular support member and said idler pulley means.

10. A combination as set forth in claim 9 wherein said tensioner has a deflection indicator means for indicating the amount of deflection of said spring washers in each position of said belt engaging means relative to said support means, said deflection indicator means comprising a scale member carried by said idler pulley means and an indicator carried by said support means in a manner to be associated with said scale member.

11. In the combination of a power transmission belt that is adapted to be operated in an endless path and a tensioner for said belt, said tensioner comprising a support means fixed relative to said belt, a belt engaging means carried by said support means and being movable relative thereto, and mechanical spring means operatively associated with said support means and said belt engaging means urging said belt engaging means relative to said support means in a belt tensioning direction and against said belt with a force to tension said belt, said spring means comprising a plurality of spring washers disposed in a stack thereof, said tensioner having compressing means compressing said stack of spring washers between said support means and said belt engaging means to provide said urging force on said belt whereby each spring washer is deflected between its inner and outer peripheries by said compressing means, the improvement wherein said stack of spring washers are deflected by said compressing means so as to operate only between approximately 100% deflection thereof to approximately 50% deflection throughout the entire normal tensioning range of movement of said belt engaging means relative to said support means.

12. A combination as set forth in claim 11 wherein said spring washers provide a substantially constant force on said belt throughout substantially said entire normal tensioning range of movement of said belt engaging means relative to said support means.

13. A combination as set forth in claim 12 wherein each spring washer has a cone height to thickness ratio of approximately 1.4 to approximately 1.8.

14. A combination as set forth in claim 13 wherein each spring washer in its relaxed condition has a diameter of approximately 2 inches, a central opening passing therethrough of approximately 1 inch in diameter, a thickness of approximately 0.035 of an inch and a cone height of approximately 0.052 of an inch.

15. A combination as set forth in claim 11 wherein said spring washers provide a substantially increasing force on said belt as said belt engaging means moves relative to said support means in said belt tensioning direction throughout said entire normal tensioning range of movement of said belt engaging means relative to said support means.

16. A combination as set forth in claim 15 wherein each spring washer has a cone height to thickness ratio of approximately 1.6 to approximately 3.0.

17. A combination as set forth in claim 16 wherein each spring washer in its relaxed condition has a diameter of approximately 2 inches, a central opening passing therethrough of approximately 1 inch in diameter, a thickness of approximately 0.030 of an inch and a cone height of approximately 0.070 of an inch.

18. A combination as set forth in claim 11 wherein said tensioning direction of movement of said belt engaging means is substantially perpendicular to said path of movement of said belt at the portion thereof that is engaged by said belt engaging means.

19. A combination as set forth in claim 18 wherein path of movement of said belt adjacent said belt engaging means is substantially V-shaped with said belt engaging means being disposed inside said V-shape and engaging said belt at the apex of said V-shape, said tensioning direction of movement of said belt engaging means substantially bisecting said V-shape.

20. A combination as set forth in claim 19 wherein said tensioner is disposed outside said endless path of movement of said belt.

* * * * *